US007309927B2

(12) United States Patent
Sugiyama et al.

(10) Patent No.: US 7,309,927 B2
(45) Date of Patent: Dec. 18, 2007

(54) ENGINE GENERATOR

(75) Inventors: Takahide Sugiyama, Shizuoka-ken (JP); Naoto Mazuka, Shizuoka-ken (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 51 days.

(21) Appl. No.: 11/315,829

(22) Filed: Dec. 22, 2005

(65) Prior Publication Data

US 2006/0163875 A1 Jul. 27, 2006

(30) Foreign Application Priority Data

Dec. 22, 2004 (JP) ............................ 2004-370619

(51) Int. Cl.
*F02B 63/04* (2006.01)
*H02K 7/18* (2006.01)

(52) U.S. Cl. ...................................................... 290/1 A

(58) Field of Classification Search ................ 290/1 A, 290/2, 1 B, 22; 123/2
See application file for complete search history.

(56) References Cited

U.S. PATENT DOCUMENTS 4,548,164 A * 10/1985 Ylonen et al. ................. 123/2
4,721,070 A * 1/1988 Tanaka et al. ................. 123/2
6,091,160 A * 7/2000 Kouchi et al. .............. 290/1 A
D478,043 S * 8/2003 Iwatate et al. ............. D13/116
6,661,107 B2 * 12/2003 Higuchi et al. ............. 290/1 A
6,758,169 B2 * 7/2004 Suzuki et al. .................. 123/3
6,917,121 B2 * 7/2005 Akimoto et al. ............ 290/1 A
7,023,101 B2 * 4/2006 Wang ......................... 290/1 A
2003/0178853 A1 * 9/2003 Du Plessis et al. ......... 290/1 A
2004/0021320 A1 * 2/2004 Yamada et al. ............. 290/1 B
2004/0155466 A1 * 8/2004 Sodemann et al. ......... 290/1 A
2006/0157988 A1 * 7/2006 Mazuka et al. ............. 290/1 A
2006/0290138 A1 * 12/2006 Kuo et al. .................. 290/1 A

FOREIGN PATENT DOCUMENTS

JP 10-213035 8/1998

* cited by examiner

*Primary Examiner*—Julio Gonzalez
(74) *Attorney, Agent, or Firm*—Knobbe, Martens, Olson & Bear, LLP

(57) ABSTRACT

A framework of an engine generator can be made up of a front frame and a rear frame which can be made from aluminum die castings. Securing frames can be configured to removeably connect the opposing bottom edges of the front frame and the rear frame, on their both sides through bolts and nuts. Handles can be configured to removeably connect the opposing top edges of the front frame and the rear frame, on their both sides through bolts and nuts. The front frame and the rear frame can be formed integral with rib portions for mounting panels respectively, and handle mounting portions and respectively, for mounting the handles.

6 Claims, 14 Drawing Sheets

ENGINE GENERATOR

PRIORITY INFORMATION

This application is based on and claims priority under 35 U.S.C. § 119 to Japanese Patent Application No. 2004-370619, filed on Dec. 22, 2004, the entire contents of which is hereby expressly incorporated by reference.

BACKGROUND OF THE INVENTIONS

1. Field of the Inventions

The present inventions relate to an engine generator having a framework.

2. Description of the Related Art

Engine generators having an engine for driving a generator to generate electric power have long been known. Some engine generators have a framework formed of resin or bent steel pipes. For example Japanese patent document JP-A-Hei 10-213035 discloses a generator with a frame formed of bent steel pipe.

This pipe framework includes a pair of left and right inverse-U shaped vertical pipe frame members, and two horizontal pipe frame members connecting opposing ends of the vertical frame members and spaced apart from each other in the forward and rearward directions. Longitudinal base plates extend between the horizontal frame members to connect their opposing bottom portions, on the left and right sides. Stays are attached between opposing upper portions of the vertical frame members of the pipe framework, and a cover plate is mounted on the stays.

SUMMARY OF THE INVENTIONS

Of the known frameworks of conventional engine generators described above, the framework formed of resin is suitable for use in a lightweight, hand-held engine generator. However, since such framework has lower strength, it cannot easily be incorporated into other even slightly larger generators, due to its low strength. With regard to designs made with bent steel pipes, design flexibility is significantly restricted. This results in problems of the difficulty of providing an engine generator of good design, and an increase in weight.

In view of the foregoing problems, it is, therefore, an objective to provide an engine generator having higher rigidity, being lightweight and capable of providing design flexibility.

Thus, in accordance with an embodiment, an engine generator can comprise an enclosure including a three dimensional framework and acoustical panels attached thereto. The framework can comprise a front frame formed in one piece and forming a front portion of the framework, a rear frame formed in one piece and forming a rear portion of the framework, at least one connecting frame for removeably connecting the front frame and the rear frame through a first securing member. At least one handle can be configured to allow a user to carry the engine generator, and can removeably connect handle mounting portions disposed on the front frame and the rear frame, through a second securing member.

DETAILED DESCRIPTION OF THE PREFERRED EMBODIMENT

Figure 1:
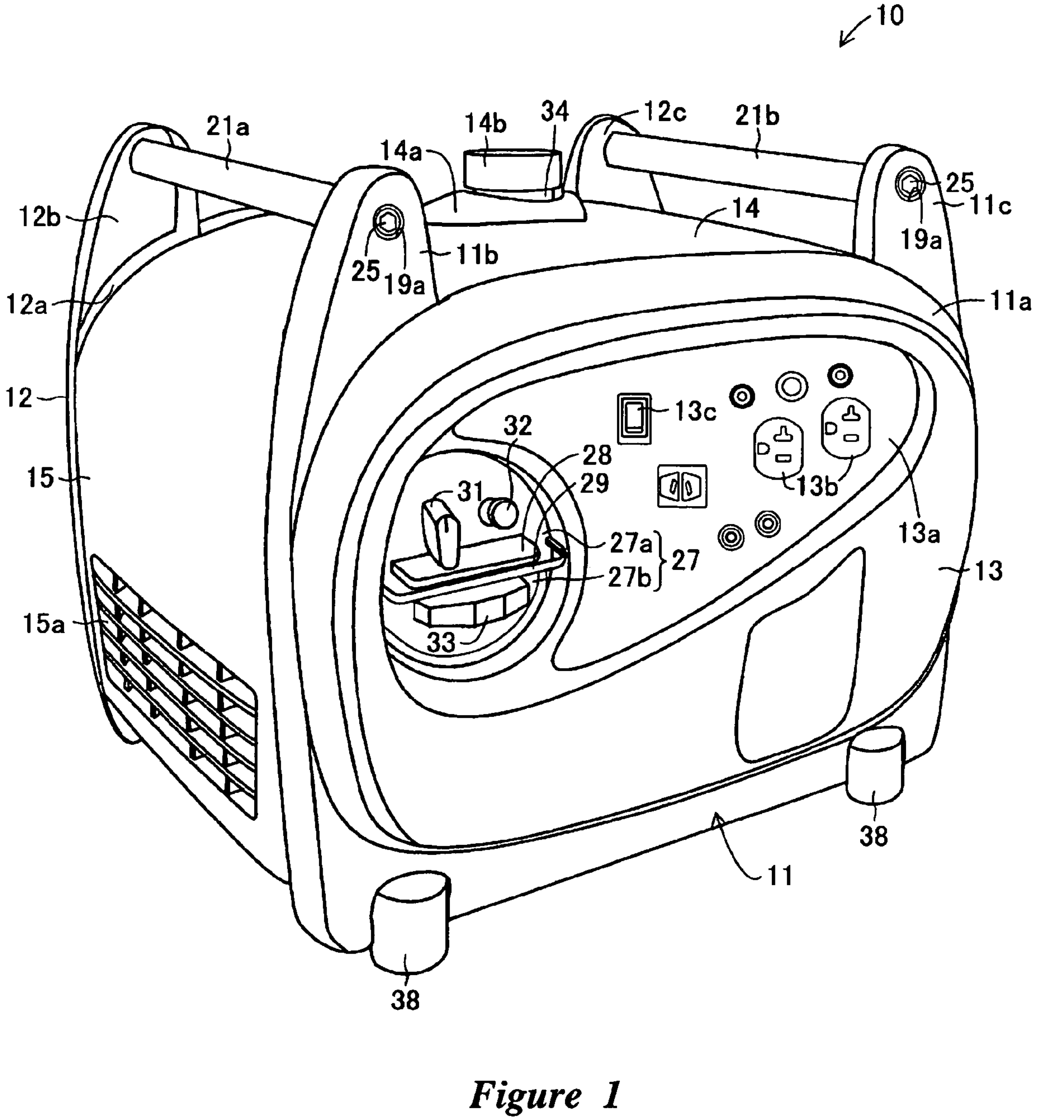
FIG. 1 is a perspective view of an engine generator in accordance with an embodiment.

An engine generator 10 frame arrangements in accordance with various embodiments of the present invention is described below with reference to drawings. The frame arrangements are described in the context of an engine generator because they have particular utility in this context. However, the fame arrangements disclosed herein can be used in other contexts, such as, for example, any device that incorporates frame members and panels.

In some embodiments, the outer surface of the engine generator 10 can be formed in a rounded, generally box shape. Additionally, the outer surface can be defined by a pair of front and rear frames 11, 12 spaced apart from each other in the forward and rearward directions. Additionally, the generator 10 can include a front panel 13 and a rear panel 17 located within the front frame 11 and the rear frame 12, respectively, and a top panel 14, an intake cover 15, an exhaust cover 16 and a bottom panel 18 located between the front frame 11 and the rear frame 12 also forming parts of the outer surface.

The front frame 11 and the rear frame 12 can be aluminum die castings of generally the same shape. The front frame 11 can be located with its outside face directed to the front side, and thus can comprise a front frame of the generator 10.

The rear frame 12 can be located with its outside face directed to the rear side, and thus can comprise a rear frame of the generator 10. Since the front frame 11 and the rear frame 12 can have the same shape, a single die set can be used to form both frames 11, 12. As such, manufacturing costs can be reduced. Also, the number of parts can be reduced, which is preferable for parts control in mass production scenarios.

Figure 6:
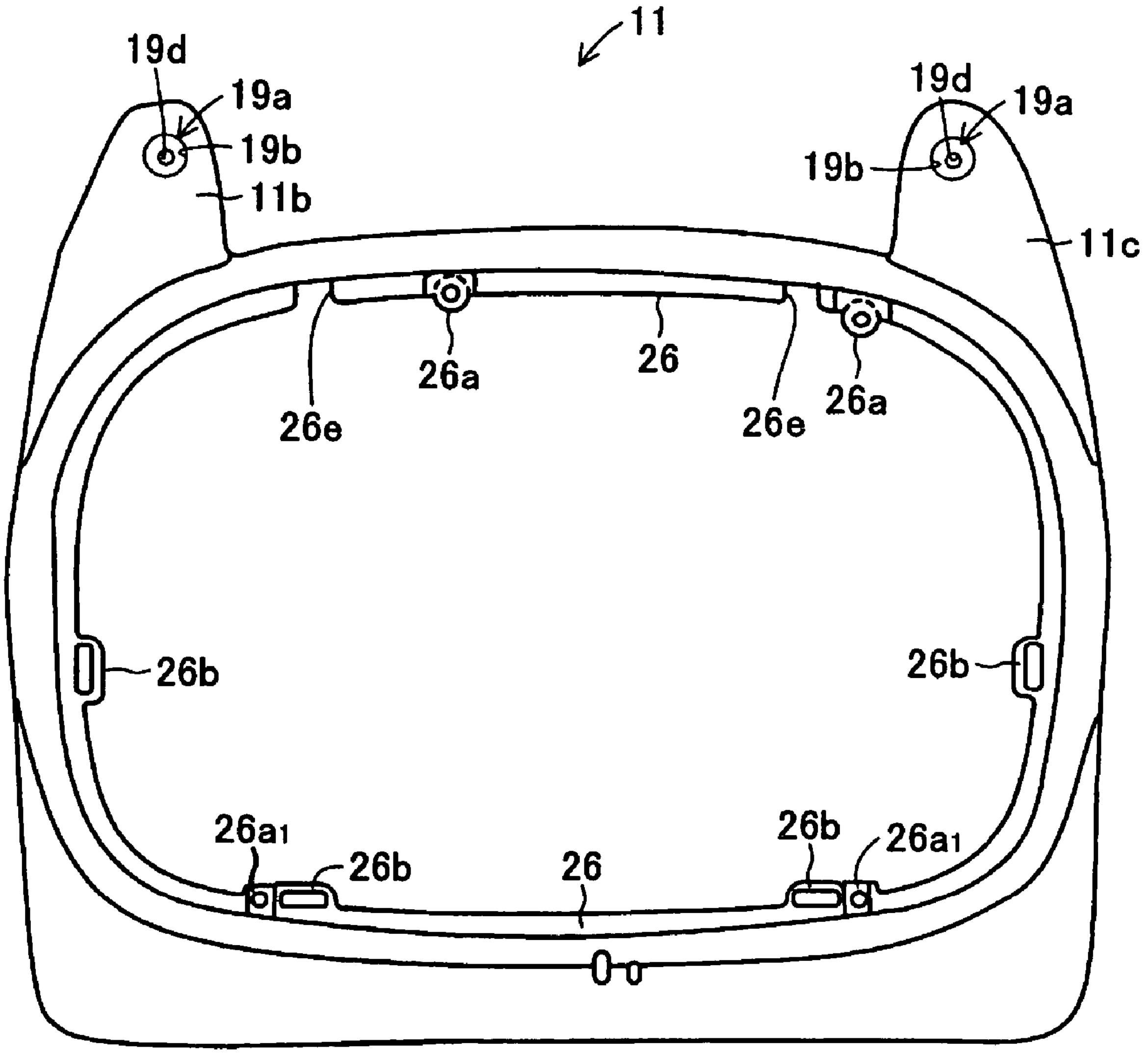
FIG. 6 is a front view of a front frame of the generator removed from the generator.
Figure 7:
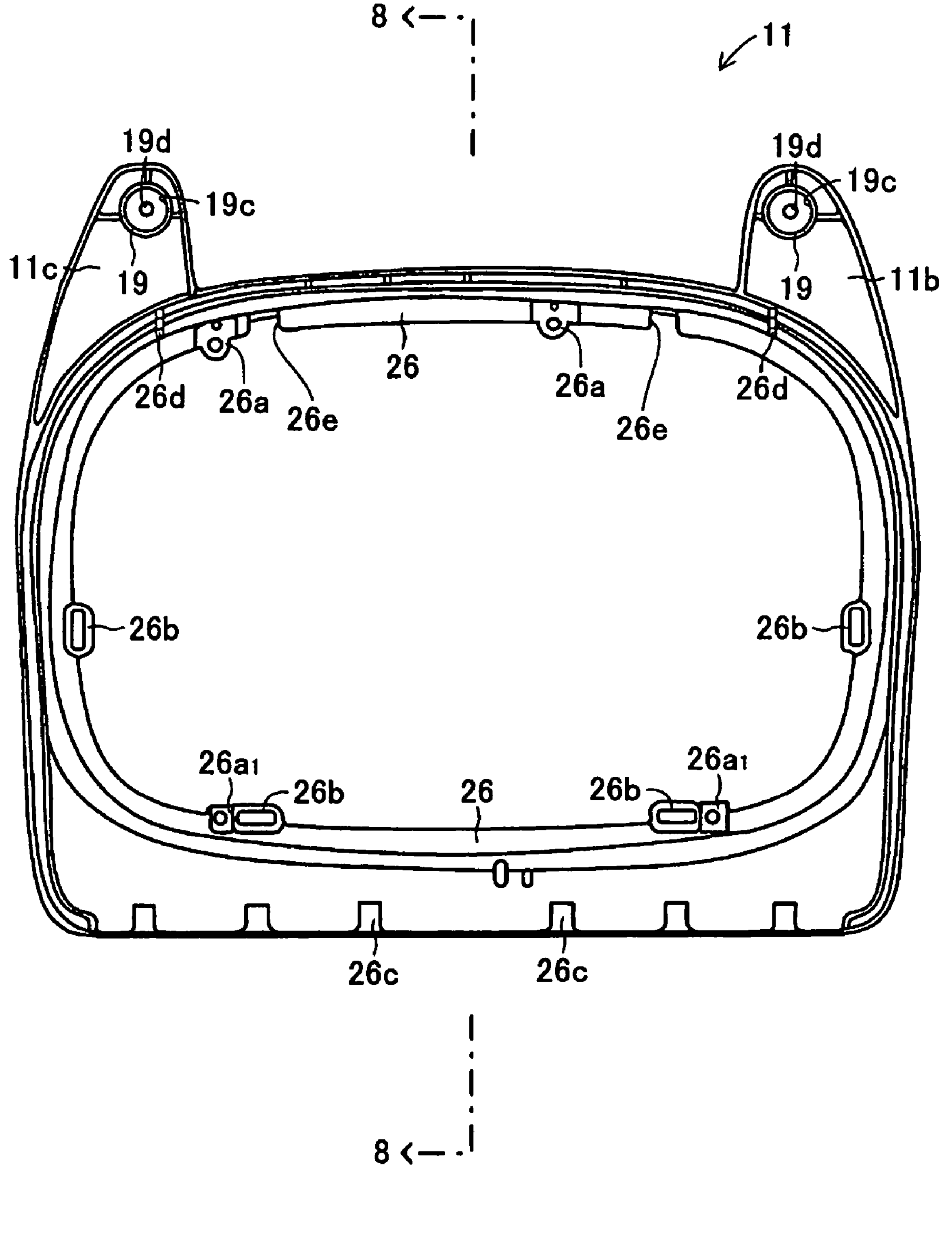
FIG. 7 is a rear view of the front frame.
Figure 8:
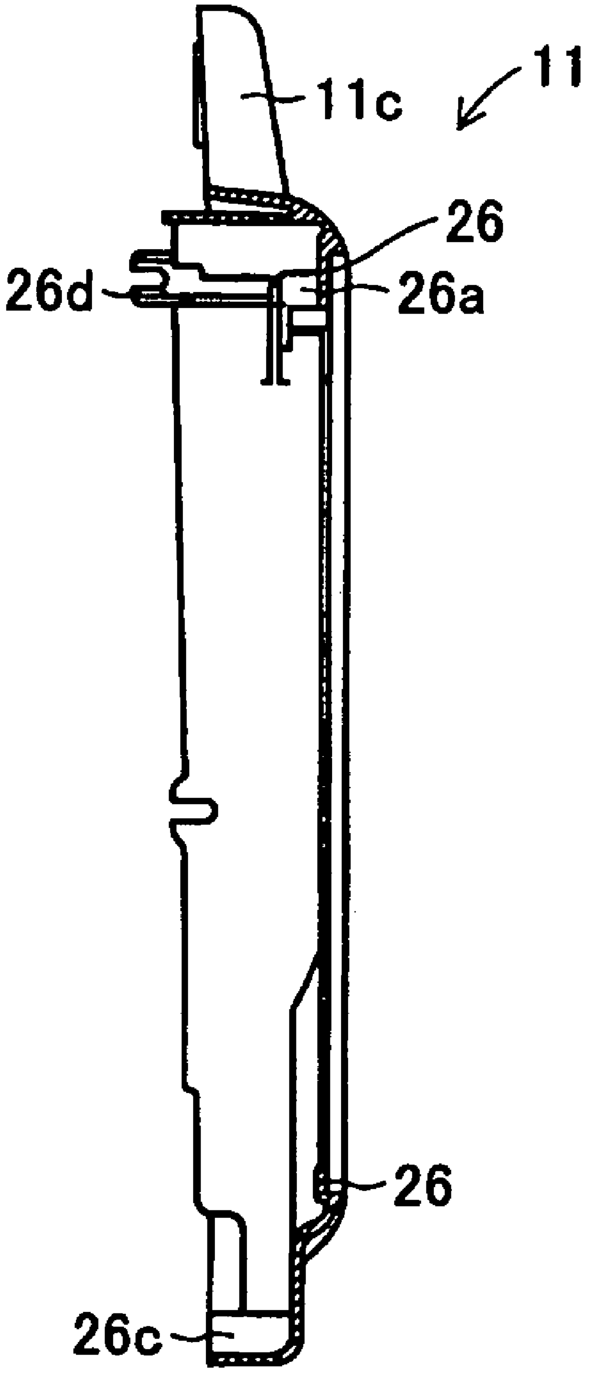
FIG. 8 is a sectional view taken along the line 8-8 of FIG. 7.

The front frame 11 and the rear frame 12 can be configured as shown in FIGS. 6 through 8 (FIGS. 6 through 8 show the front frame 11). The front frame 11 and the rear frame 12 can include frame bodies 11*a*, 12*a*, respectively, formed in a generally square shape with both top sides having a round shape. The top left and right sides of the frame body 11*a* can be formed with a pair of handle mounting portions 11*b*, 11*c* extending upwardly, and the both top sides of the frame body 12*a* can also be formed with a pair of handle mounting portions 12*b*, 12*c* extending upwardly.

The side faces of the handle mounting portions 11*b*, 11*c*, 12*b*, and 12*c*, laterally outside the engine generator 10 each extend upwardly to have a curved shape from an upper side portion of the engine generator 10 to the inside thereof. The side faces of the handle mounting portions 11*b*, 11*c*, 12*b*, and 12*c*, laterally inside the engine generator 10 each can extend generally linearly from the top face of the engine generator 10 to the slightly outside thereof and upwardly.

The outside faces of the handle mounting portions 11*b*, 11*c*, 12*b*, and 12*c* in the forward and rearward directions of the engine generator 10 each extend inclinedly upwardly and inwardly from a top portion of the front or rear face of the engine generator 10. The inside faces of the handle mounting portions 11*b*, 11*c*, 12*b*, and 12*c* in the forward and rearward directions of the engine generator 10 each can have a recess corresponding to the shape of the outside face, as shown in FIG. 7. Their peripheral edges extend generally linearly upwardly from the top face of the engine generator 10 as shown in FIG. 8. Thus, upper portions of the handle mounting portions 11*b*, 11*c*, 12*b*, and 12*c* can be tapered toward the inside of the engine generator 10.

The inside faces of the upper portions of the handle mounting portions 11*b*, 11*c*, 12*b*, and 12*c* can each be formed with a generally cylindrical boss portion 19. The central portion of the boss portion 19 can be formed with an insertion hole 19*a* extending therethrough in the forward and rearward directions.

Figure 9:
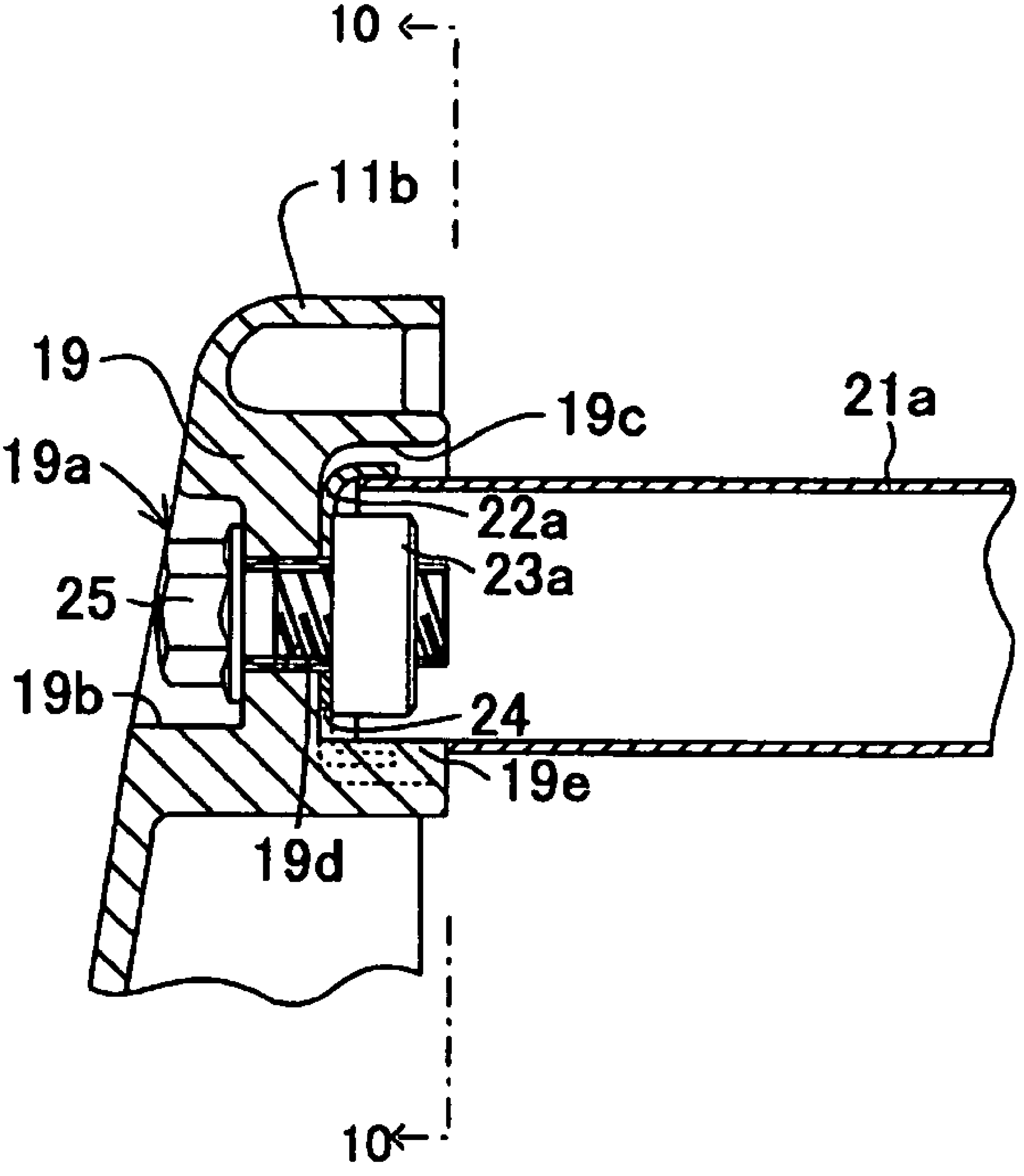
FIG. 9 is an enlarged sectional view, showing the state in which a handle is mounted to a handle mounting portion.

As shown in FIG. 9, the insertion hole 19*a* can include a middle-diameter portion 19*b* positioned in the outside face of the handle mounting portion, a large-diameter portion 19*c* positioned in the inside face of the handle mounting portion, and a small-diameter portion 19*d* formed between the middle-diameter portion 19*b* and the large-diameter portion 19*c*. However, other configurations can also be used.

Figure 10:
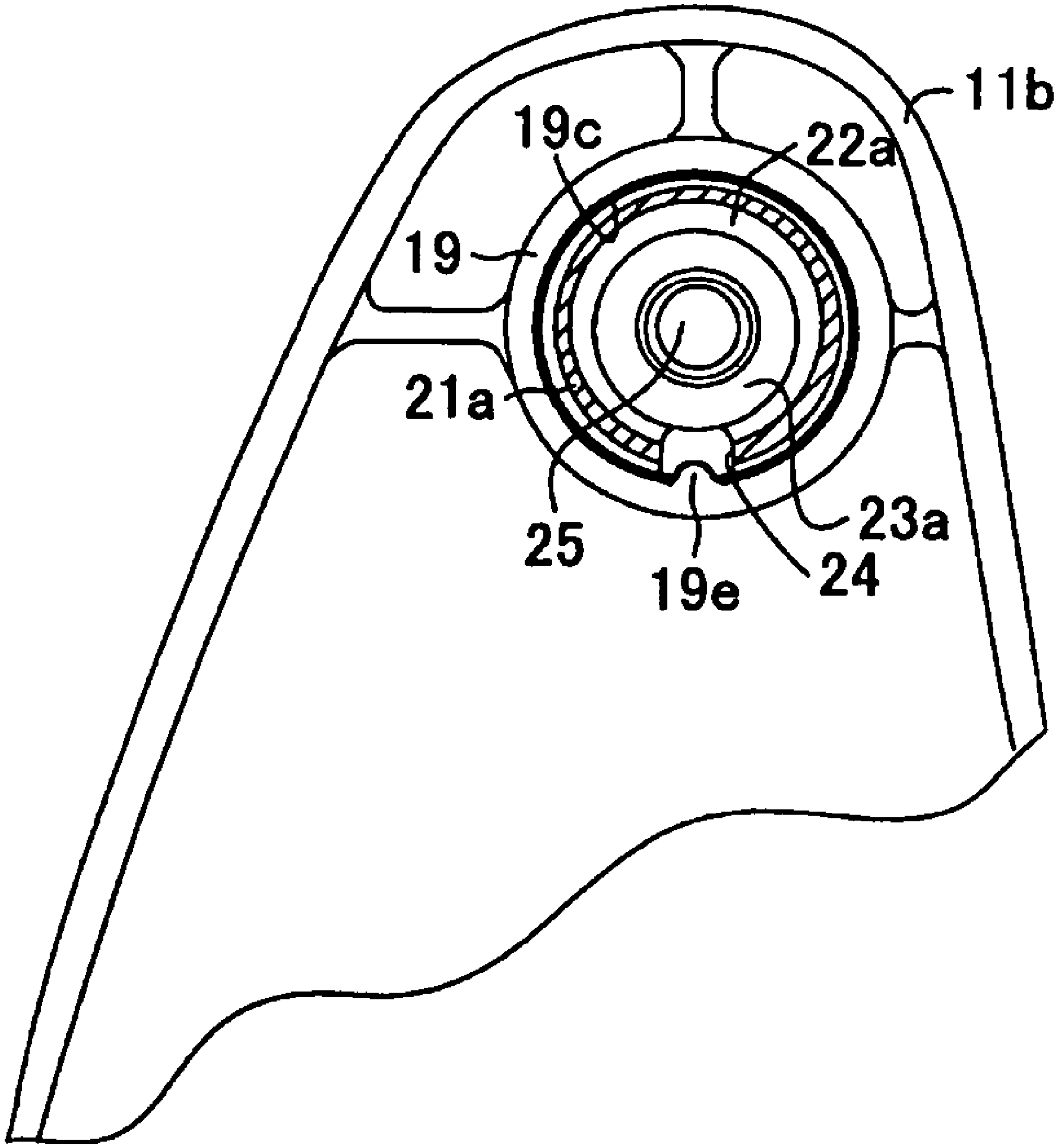
FIG. 10 is a sectional view taken along the line 10-10 of FIG. 9.

A small projection 19*e* can also be formed at the lower edge of the large-diameter portion 19*c*, as shown in FIG. 10. Tubular handles 21*a*, 21*b* can extend between the opposing handle mounting portions 11*b*, 12*b* and 11*c*, 12*c*, respectively, and can be attached thereto through the insertion holes 19*a*.

Figure 11:
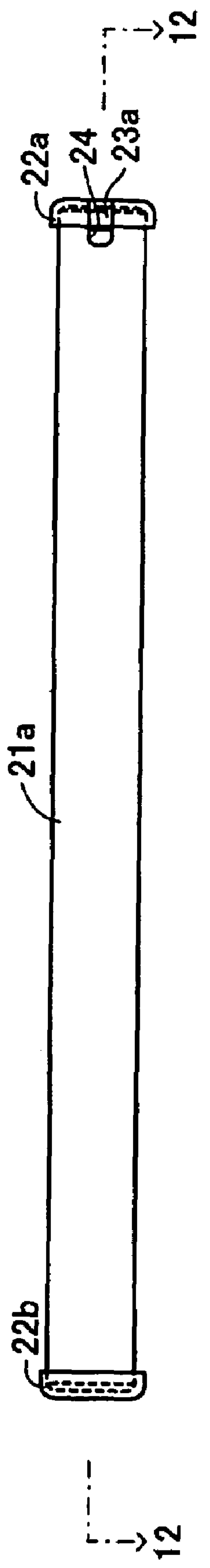
FIG. 11 is a bottom view of the handle.
Figure 12:
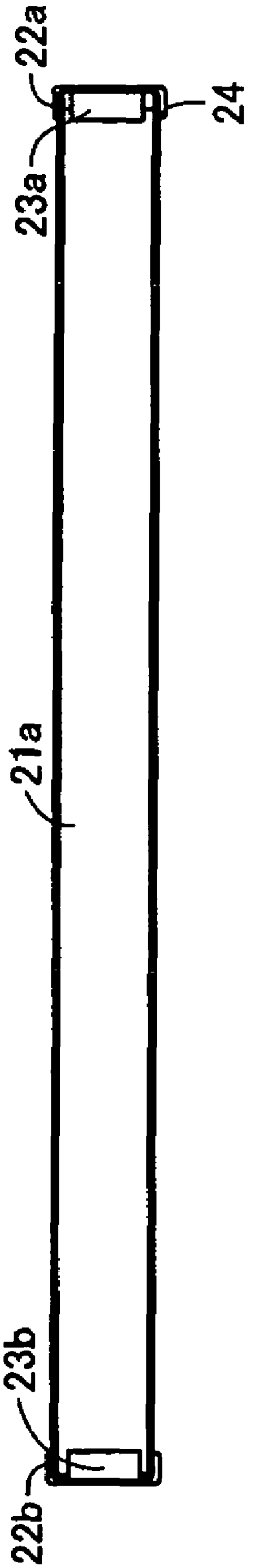
FIG. 12 is a sectional view taken along the line 12-12 of FIG. 11.

The handles 21*a*, 21*b* can include iron pipes. Cap-like plates 22*a*, 22*b* each having a hole formed in their central portions can be mounted to the opposing open ends, respectively, of the respective handles 21*a*, 21*b*, as shown in FIGS. 11 and 12 (the handle 21*a* is shown). Nuts 23*a*, 23*b* can be fixed to the inside faces of the plates 22*a*, 22*b*, respectively. A notch 24 can be provided at the ends of the handles 21*a*, 21*b* to which the plates 22*a* are mounted, and at the lower edges of the plates 22*a* (in the state of FIGS. 9, 10 and 12).

The ends of the handles 21*a*, 21*b* to which the plates 22*a* are mounted can be positioned in the large-diameter portions 19*c* of the handle mounting portions 11*b*, 11*c*, respectively. The ends of the handles 21*a*, 21*b* to which the plates 22*b* are mounted can also be positioned in the large-diameter portions 19*c* of the handle mounting portions 12*b*, 12*c*, respectively. A bolt 25 can be inserted in each insertion hole 19*a* and the nut 23*a* (23*b*) can be screwed on the bolt 25, so that the ends of the handles 21*a*, 21*b* can be secured to the corresponding handle mounting portions 11*b*, 12*b*, and 11*c*, 12*c*. Other configurations can also be used.

In this case, if the small projections 19*e* of the insertion holes 19*a* are located in the notches 24 of the handles 21*a*, 21*b*, the handles 21*a*, 21*b* can be prevented from rotation relative to the handle mounting portions 11*b*, 12*b*, and 11*c*, 12*c*, respectively. This allows the bolts 25 to be smoothly screwed in the nuts 23*a*, 23*b*. The engine generator 10 can be carried by gripping the pair of handles 21*a*, 21*b*. In this case as well, since the handles 21*a*, 21*b* are prevented from rotation due to the engagement of the notch 24 and the small projection 19*e*, the engine generator 10 can be carried more easily and comfortably.

The inner peripheral edges of the front frame 11 and the rear frame 12 can be formed with rib portions 26 for mounting the front panel 13 and the rear panel 17 along the inner peripheries of the front frame 11 and the rear frame 12. Each rib portion 26 can be formed with plural fitting hole forming portions 26*a*, 26*a*1, and 26*b* spaced apart from each other. The axial direction (direction of the holes) of the rib portions 26 and all the fitting hole forming portions 26*a*, 26*a*1, and 26*b* can be the same as that of the boss portions 19. However, other configurations can also be used.

The inside faces of the bottom edges of the front frame 11 and the rear frame 12 can be formed with six boss portions 26*c* each, spaced apart from each other. The front frame 11 and the rear frame 12 can be formed using a forming device having a die set made up of a fixed die and a movable die, in a way such that the movable die can be moved in one direction relative to the fixed die.

The front panel 13 can be attached within the front frame 11 along the rib portion 26 and as such can comprise a front face of the engine generator 10. The front panel 13 can be formed of resin material in one piece. Both sides of the top edge of the front panel 13 can be formed with projections (not shown) to be inserted in openings 26*e* of the rib portion 26.

The peripheral edge of the inside face of the front panel 13 can be fitted with sheet-metal clips (not shown). The projections can be inserted in the corresponding openings 26*e* of the rib portion 26, and the sheet-metal clips can be fitted in the fitting hole forming portions 26*b*, so that the front panel 13 can be mounted to the front frame 11 in the state of being prevented from coming off. However, other configurations can also be used.

Figure 2:
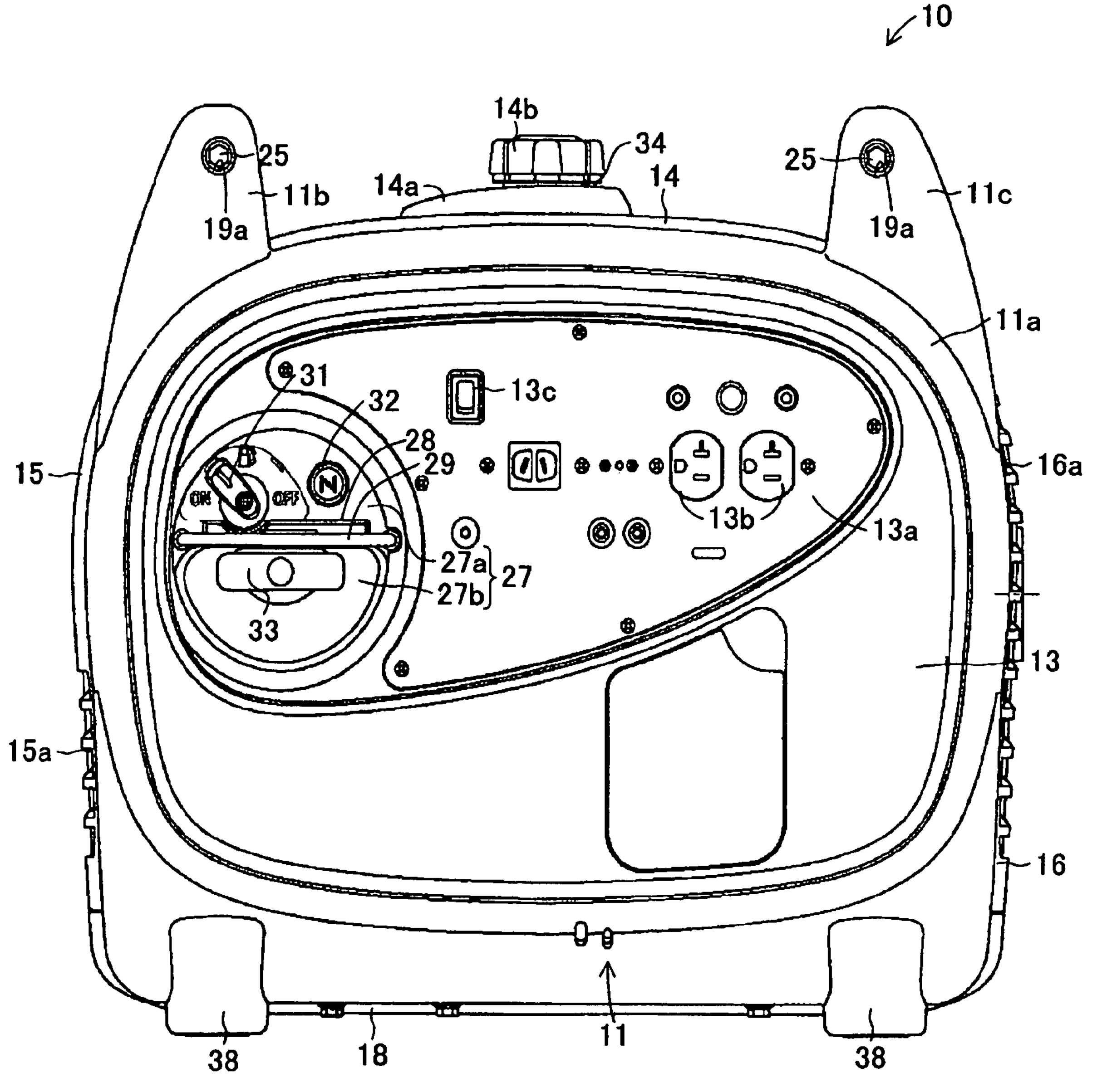
FIG. 2 is a front elevational view of the engine generator.
Figure 3:
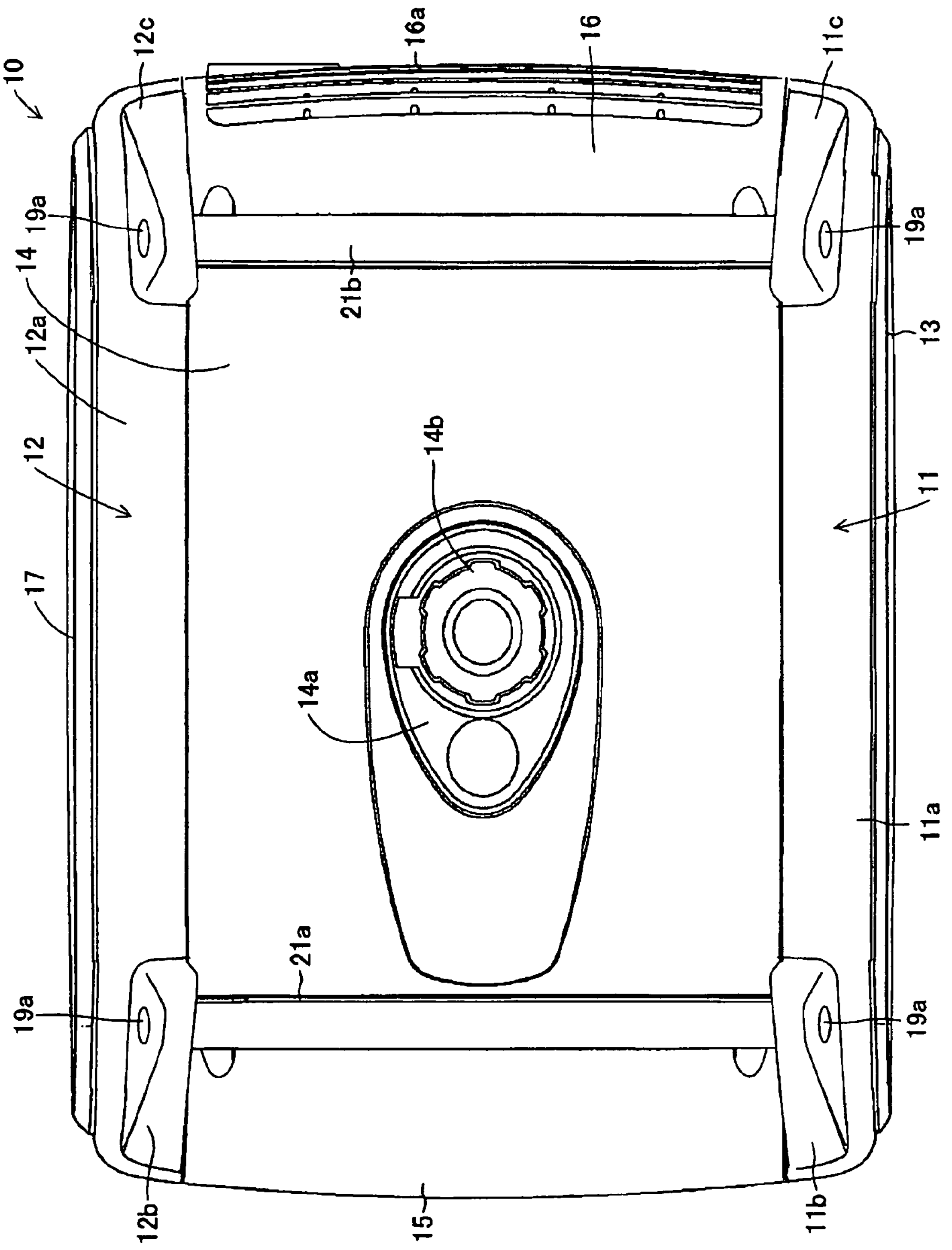
FIG. 3 is a top plan view of the engine generator.
Figure 4:
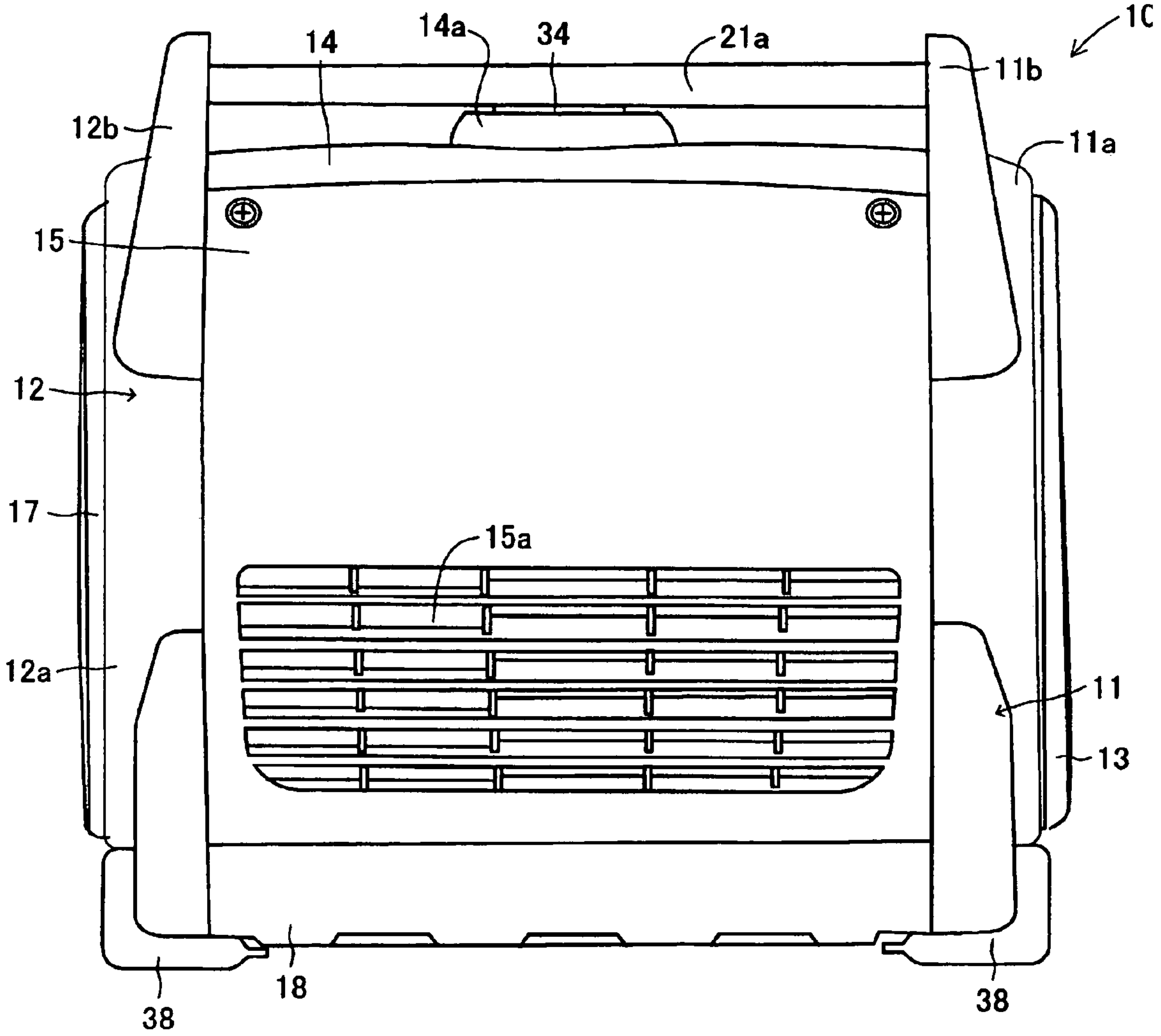
FIG. 4 is a left side elevational view of the engine generator.
Figure 5:
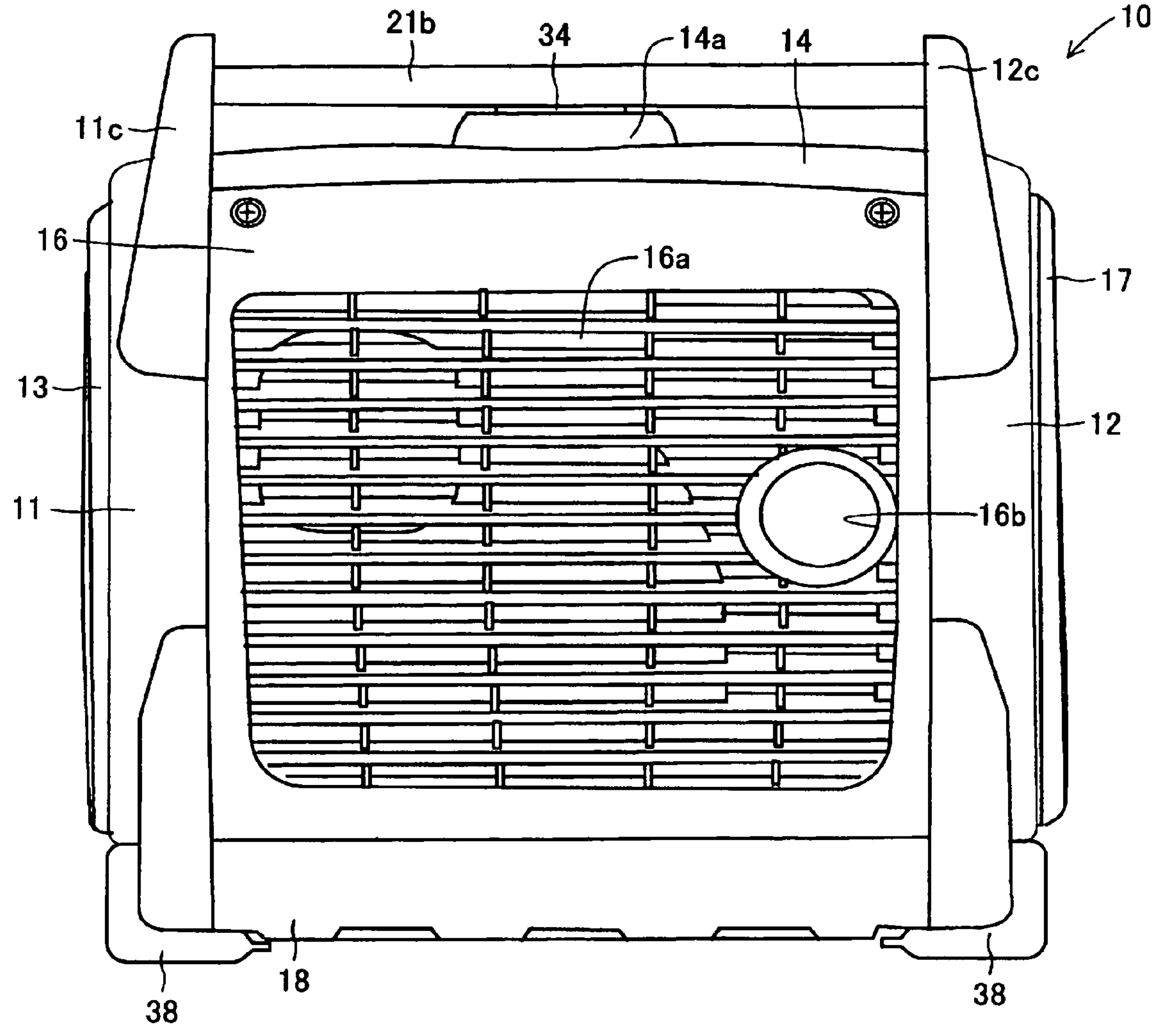
FIG. 5 is a right side elevational view of the engine generator.

The front panel 13 can be formed in a generally square shape with rounded corners, as viewed from the front side. An upper portion of the front panel 13 can be formed with a recess 13*a* of a generally oval shape having a large vertical width at its left portion (on the left-hand side of FIGS. 1 and 2) and a small vertical width at its right portion. A circular recess 27 can be formed in the left portion of the recess 13*a*. There can also be provided outlets 13*b*, various switches 13*c*, and the like in the portion other than the recess 27 of the recess 13*a*.

The recess 27 can be separated into an upper portion and a lower portion by a partition 28, which can extend generally horizontally. The partition 28 can comprise a plate-like wall member projecting toward the front side.

A protective portion 29 of, for example, an iron bar can be provided in a manner to enclose the front face and the opposite faces of the partition 28. An upper area 27*a* comprising the upper portion of the recess 27 can have a smaller (shallower) depth than that of a lower area 27*b* which can comprise the lower portion of the recess 27.

The upper area 27*a* of a shallower depth can have a cock operating portion 31 and a choke operating portion 32 laterally aligned with each other. The lower area 27*b* of a deeper depth can have a recoil knob 33. The cock operating portion 31, choke operating portion 32 and recoil knob 33 are disposed in a manner not to project outward from the surface of the peripheral edge of the front panel 13. The partition 28 can be formed with the front panel 13 in one body, and the protective portion 29 can be fixed to the front panel 13 with the ends of the protective portion 29 inserted in the front panel 13. However, other configurations can also be used.

The top panel 14 can be attached between the opposing top edges of the front frame 11 and the rear frame 12 and as such can comprise a top face of the engine generator 10. The top panel 14 can be formed in the shape of a curved surface and extends laterally with its central portion curved upwardly. The generally central portion of the top panel 14 can have a fuel supply portion inserting portion 14*a* formed to be raised for allowing insertion of a fuel supply port 34 of a fuel tank (not shown). A tank cap 14*b* can be attached to the fuel supply port 34 through the fuel supply portion inserting portion 14*a*.

The intake cover 15 and the exhaust cover 16 can be attached between the opposing side edges of the front frame 11 and the rear frame 12 and as such can comprise side faces of the engine generator 10. A lower portion of the intake cover 15 can be formed with a plurality of lateral intake slits 15*a* vertically aligned with each other. The exhaust cover 16 at the surface of its large central portion can be also formed with a plurality of lateral exhaust slits 16*a* vertically aligned with each other. A circular exhaust hole 16*b* can be formed in a vertically generally central portion on the rear side of the exhaust cover 16.

The rear panel 17 can be attached within the rear frame 12 and as such can comprise a rear face of the engine generator 10. The overall shape of the rear panel 17 can be generally the same as that of the front panel 13. However, other configurations can also be used. Additionally, the rear panel 17 can be formed with no recesses which are equivalent to the recesses 13*a* and 27 of the front panel 13. As with the front panel 13, both sides of the top edge of the rear panel 17 can be formed with projections to be inserted in the openings 26*e* of the rib portion 26 of the rear frame 12. Both sides of the inside face of the rear panel 17 can be fitted with sheet-metal clips. Also, there can be formed screw insertion holes (not shown) in both sides of the bottom peripheral edge of the rear panel 17.

Each fitting hole forming portion 26*a*1 can be fitted with a securing member (not shown), to which a nut can be fixed. The securing member can have a screw insertion hole formed coaxially with a hole of the nut. However, other configurations can also be used.

The rear panel 17 can be mounted to the rear frame 12 in a way such that the projections of the rear panel 17 are inserted in the corresponding openings 26*e* of the rib portion 26 of the rear frame 12. Additionally, the sheet-metal clips can be fitted in the left and right fitting hole forming portions 26*b*. Bolts (not shown) can be inserted in the fitting hole forming portions 26*a*1 and the screw insertion holes of the securing members. Then, the nuts fixed to the securing members can be fitted on the ends of the bolts at the inside face of the rear panel 17. However, other methods for mounting the rear panel can also be used.

The periphery of each screw insertion hole of the outside face of the rear panel 17 can be formed with a recess to prevent the bolt head from projecting outside. The rear panel 17 can be removed by loosening the bolts, in the case of maintenance of the engine generator 10, for example.

The fitting hole forming portions 26*a* of the front frame 11 and the rear frame 12 can be configured to mount the fuel tank. Both sides of top portions of the inside faces of the front frame 11 and the rear frame 12 can be formed with mounting portions 26*d* for mounting the intake cover 15 and the exhaust cover 16.

The bottom panel 18 can be attached between the opposing bottom edges of the front frame 11 and the rear frame 12 and as such can comprise a bottom face of the engine generator 10. The left and right edges of the bottom panel 18 are slightly raised from the opposite sides of the bottom face and extend upwardly, and as such can comprise lower portions of the corresponding side faces of the engine generator 10.

The top panel 14, intake cover 15, exhaust cover 16, rear panel 17 and bottom panel 18 can each be integrally formed of resin material, and as such, can serve as acoustical panels. There can be interposed a pair of securing frames 35*a*, 35*b* made of metal sheets shown in FIGS. 13 and 14, which can serve as a connecting frame, between the front frame 11 and the rear frame 12 to securely connect these frames on the left and right sides. The pair of securing frames 35*a*, 35*b*, the front frame 11, the rear frame 12 and the handles 21*a*, 21*b* can serve as a framework.

Each of the securing frames 35*a*, 35*b* can be formed in a trapezoidal shape, however, other shapes can also be used. Each of the securing frames 35*a*, 35*b* can also have a plate-like portion of a larger width than the distance between adjacent two boss portions 26*c* of the front frame 11 and the rear frame 12, and wall portions of a small height formed on left and right sides of the plate-like portion. The boss portions 26*c* of the front frame 11 and the rear frame 12, and portions of the securing frames 35*a*, 35*b* which correspond to the boss portions 26*c* can be formed with screw insertion holes. However, other configurations can also be used.

Bolts 36 can be inserted into these screw insertion holes and then screwed in nuts 37 which can be welded to the top faces of the securing frames 35*a*, 35*b*, so that the lower edges of the front frame 11 and the rear frame 12 are connected and secured to each other through the securing frames 35*a*, 35*b*. In some embodiments, the securing frame 35*a* can be fixed to the second and third boss portions 26*c* from the left of FIG. 14. The securing frame 35*b* can be fixed to the rightmost boss portion 26*c* and the second boss portion 26*c* from the right of FIG. 14.

Figure 13:
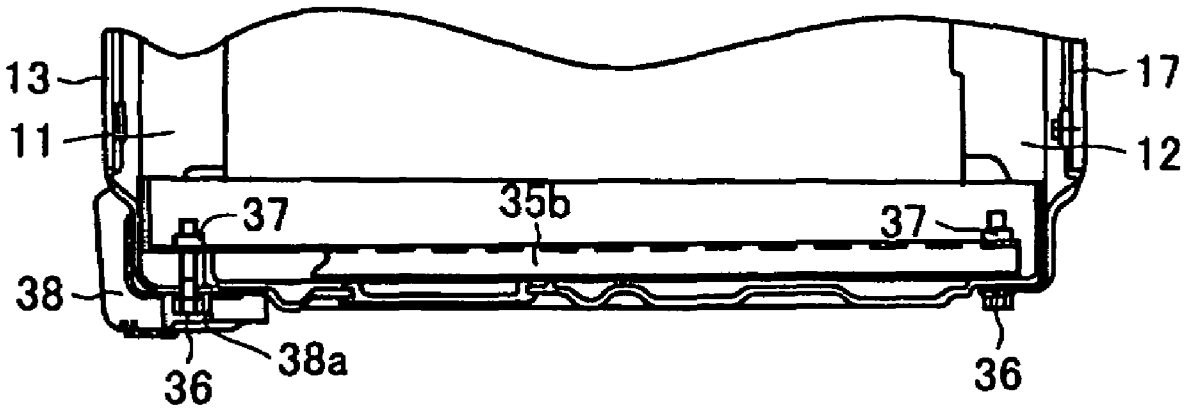
FIG. 13 is a sectional view, showing a state in which the front frame and a rear frame are connected to each other with a securing frame.

Rubber mounts 38 can be attached at the sides of the bottom edges of the front frame 11 and the rear frame 12, below the top ends of the handle mounting portions 11*b*, 11*c*, 12*b*, and 12*c*. In FIG. 13, the mount 38 is not illustrated on the rear side, in order to show the outer shapes of the rear frame 12 and the like.

The mount 38 can have a bottom portion and a side portion. The bottom portion can be located in contact with the bottom face of the front frame 11 or rear frame 12, and the bottom panel 18. The side portion can extend upwardly from one end of the top face of the bottom portion and can be located in contact with the outside face of the front frame 11 or rear frame 12. There can also be provided a reinforcing metal fitting (not shown) which extends from the top face of the bottom portion into the side portion.

Figure 14:
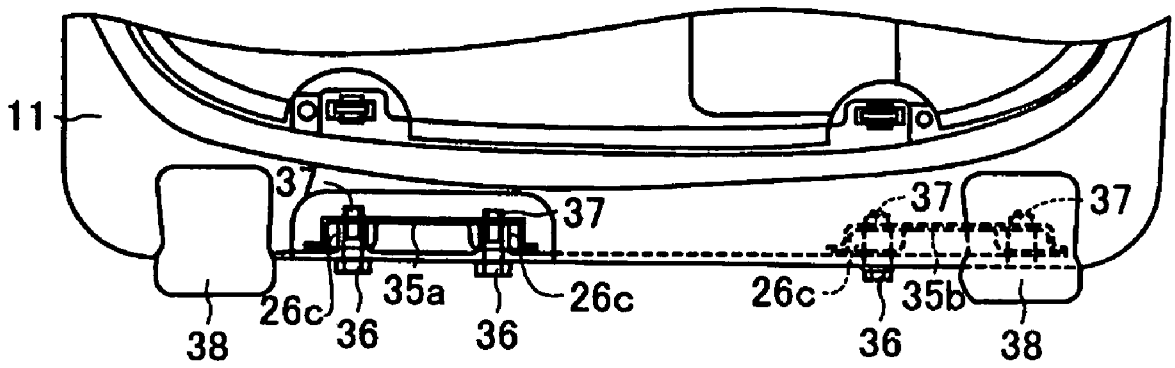
FIG. 14 is a partially cutaway sectional view, showing the state of the front frame and the securing frames being connected together.

Of the mounts 38, the one shown on the left side of FIG. 14 can be fixed to the leftmost boss portion 26*c* through a bolt and nut (not shown). The mount 38 shown on the right side of FIG. 14 can be fixed to the securing frame 35*b* through the bolt 36 and the nut 37.

For example, the bottom portion of each mount 38 can be formed with an insertion hole 38*a* vertically extending therethrough. The left mount 38 can be mounted in a way such that the insertion hole 38*a* can be aligned with the screw insertion hole of the boss portion 26*c*, the bolt can be inserted in these holes, and then the nut can be screwed on the end of the bolt.

On the other hand, the right mount 38 can be mounted in a way such that the insertion hole 38*a* can be aligned with the screw insertion holes of the boss portion 26*c* and securing frame 35*b*, the bolt 36 can be inserted in these holes, and then the nut 37 fixed to the top face of the securing frame 35*b* can be screwed on the bolt 36.

The engine generator 10 can also include other devices such as an engine and a generator driven by the engine for producing electrical power. However, these devices are not related to the present inventions and therefore are not described in detail. In some embodiments, the engine generator 10 can weigh about 30 to 40 kg.

In some embodiments, to start the engine generator 10, the user first operates the cock operating portion 31 to open (turn on) a fuel cock and then pulls the choke operating portion 32 adjacent to the cock operating portion 31. In such state, the user pulls the recoil knob 33 to start the engine (not shown). After the engine is warmed up, the user can return the choke operating portion 32 to its original position. Then, power generated by the engine generator 10 can be used in other equipment by plugging a cable in the outlet 13*b*.

The noise produced during the actuation of the engine generator 10 can be reduced due to sound attenuating effect of the panels including the front panel 13. Further, carrying the engine generator 10 before or after use can be facilitated if the user grips the handles 21*a*, 21*b*. Since the strength of the framework in accordance with the present embodiments is enhanced, if plural engine generators 10 are stacked one above the other for storage, the lower engine generator can withstand the weight of the upper engine generators.

With the front frame 11 forming a front portion of the framework, and the rear frame 12 forming a rear portion of the framework and with each comprised of a one-piece aluminum die casting, the framework can be sufficiently strong to support the weight other generators or items stacked upon the generator 10.

Further, in some embodiments, the framework can be made up of only the following six members: the front frame 11, rear frame 12, handles 21*a*, 21*b*, and securing frames 35*a*, 35*b*. Such a framework can be lighter and more rigid and can thus be formed with a small number of members, thereby reducing some manufacturing costs. Further, the handles 21*a*, 21*b* used for carrying the engine generator 10 are also used to connect the front frame 11 and the rear frame 12, thereby reducing the number of parts.

Further, the outer surface of the engine generator 10 can be formed with a curved surface, and there can be provided the front panel 13, within the front frame 11, having the recess 13*a* and hence having higher design quality. Thus, the design quality of the overall engine generator 10 can be improved. Further, in some embodiments of the engine generator 10, since the front frame 11 and the rear frame 12 are removeably connected to the handles 21*a*, 21*b* and the securing frames 35*a*, 35*b* through the bolts 25, 36, and the like, the framework can be easily disassembled if necessary.

Further, in some embodiments, the front frame 11 can be formed integral with the rib portion 26, and the handle mounting portions 11*b*, 11*c* for mounting the handles 21*a*, 21*b*. The rear frame 12 can be also formed integral with the rib portion 26, and the handle mounting portions 12*b*, 12*c* for mounting the handles 21*a*, 21*b*.

Thus, in such embodiments, the front panel 13 and the rear panel 17 can be brought in contact with the respective surfaces of the rib portions 26 and mounted in position, thereby facilitating mounting the front panel 13 and the rear panel 17. Further, the handle mounting portions 11*b*, 11*c* and 12*b*, 12*c* for mounting the handles 21*a*, 21*b* to the front frame 11 and the rear frame 12 are formed integral with the front frame 11 and the rear frame 12, respectively. Thus, the handles 21*a*, 21*b* are securely mounted.

Further, in some embodiments, the front frame 11 can be formed integral with the fitting hole forming portions 26*a*1, 26*b* for mounting the front panel 13, and the rear frame 12 can be also formed integral with the fitting hole forming portions 26*a*1, 26*b* for mounting the rear panel 17. The front panel 13 and the rear panel 17 are fixed to the fitting hole forming portions 26*a*1, 26*b* of the front frame 11 and the rear frame 12, respectively, through the sheet-metal clips, bolts and nuts. Thus, accuracy in assembly of the front panel 13 and the rear panel 17 can be improved, as well as the quality of appearance. Further, the outside face of the front panel 13 can be formed with recesses, in which the bolt heads are positioned. This makes the bolt heads less visible, so that the quality of appearance can be further improved.

Further, the notch 24 can be formed at the ends of the handles 21*a*, 21*b* to which the plates 22*a* are mounted, and at the lower edges of the plates 22*a*, and the small projection 19*e* to be fitted in the notch 24 can be formed at the insertion hole 19*a* of the handle mounting portions 11*b*, 11*c*. This prevents rotation of the handles 21*a*, 21*b* when the bolt 25 and the nut 23*a* are fitted together. Therefore, mounting the handles 21*a*, 21*b* are smoothly achieved. Also, in the case of carrying the engine generator 10 by gripping the handles 21*a*, 21*b*, since rotation of the handles 21*a*, 21*b* can be prevented, the engine generator 10 can be easily carried.

The engine generator according to the present invention is not limited to the embodiment described above and can be practiced with appropriate modifications. For example, in the foregoing embodiment, there are provided the two handles 21*a*, 21*b*. However, only one handle may be provided. In this case, it is preferable that the handle can be disposed in the laterally central portion of the top face of the engine generator, and the securing frames are interposed between the opposing top edges of the front frame and the rear frame and between the opposing bottom edges of the front frame and the rear frame, and attached thereto on the left and right sides. Further, the number of the securing frames may be changed depending on the shape of the engine generator.

Further, the pair of handles may be pipes of a polygonal shape such as quadrangle, in which case the large-diameter portion of the boss portion 19 is formed in a corresponding shape. Further, only the opposing ends of the pair of handles may be formed in a quadrangle shape or the like, in which case the large-diameter portion is formed to correspond to such shape. Further, projections may be formed on the pair of handles, in which case a recess is formed in the large-diameter portion. Further, in the foregoing embodiment, the front frame 11 and the rear frame 12 are aluminum die castings. However, the front frame 11 and the rear frame 12 may be formed by any process other than die casting process. Further, the rest of the configuration, materials and the like of the engine generator can be modified as appropriate within the technical scope of the present invention.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. An engine generator comprising an enclosure including a three dimensional framework and acoustical panels attached thereto, the framework comprising a front frame formed in one piece and forming a front portion of the framework, a rear frame formed in one piece and forming a rear portion of the framework, at least one connecting frame for removeably connecting the front frame and the rear frame through a first securing member, and at least one handle configured to allow a user to carry the engine generator, removeably connecting handle mounting portions disposed on the front frame and the rear frame, through a second securing member, wherein the handle mounting portions are disposed on top left and right sides of the front frame and the rear frame, and wherein a pair of two connecting frames connect opposing bottom portions of the front frame and the rear frame, on their left and right sides, and a pair of two handles connect the opposing handle mounting portions of the front frame and the rear frame; and wherein the front frame and the rear frame comprise aluminum die castings, and each frame being formed integral with both a panel mounting rib portion for mounting the acoustical panel and the handle mounting portion;

wherein the panel mounting rib portion and the handle mounting portion are configured so that a die for forming the front frame and the rear frame can be moved in one direction into operative mating with a corresponding mold.

2. The engine generator according to claim 1, wherein the front frame and the rear frame comprise aluminum die castings, and each frame being formed integral with both a panel mounting rib portion for mounting the acoustical panel, and the handle mounting portion.

3. The engine generator according to claim 2 additionally comprising a rotation preventing portion configured to preventing rotation of the handle about its axis, provided between the handle mounting portion of at least one of the front frame and the rear frame, and the handle.

4. The engine generator according to claim 1, wherein the front frame and the rear frame are each formed integral with boss portions for securing the acoustical panels, the acoustical panels being secured to the boss portions through third securing members.

5. The engine generator according to claim 1 additionally comprising a rotation preventing portion configured to preventing rotation of the handle about its axis, provided between the handle mounting portion of at least one of the front frame and the rear frame, and the handle.

6. An engine generator comprising an enclosure including a three dimensional framework and acoustical panels attached thereto, the framework comprising a front frame formed in one piece and forming a front portion of the framework, a rear frame formed in one piece and forming a rear portion of the framework, at least one connecting frame for removeably connecting the front frame and the rear frame through a first securing member, at least one handle configured to allow a user to carry the engine generator, removeably connecting handle mounting portions disposed on the front frame and the rear frame, through a second securing member, and a rotation preventing portion configured to preventing rotation of the handle about its axis, provided between the handle mounting portion of at least one of the front frame and the rear frame, and the handle, wherein the handle is formed in a tubular shape, and the rotation preventing portion comprises an engaging portion formed at the handle mounting portion, and a receiving portion formed in the handle to receive the engaging portion.

* * * * *